3,022,604
PROCESS FOR BOOSTING THE FLOW OF ROSIN FROM CONIFERS BY APPLYING A SUBSTITUTED UREA
Arthur Greth and Rolf Zimmermann, Wiesbaden-Biebrich, Germany, assignors to Chemische Werke Albert, Wiesbaden-Biebrich, Germany, a corporation of Germany
No Drawing. Filed Nov. 2, 1960, Ser. No. 66,689
Claims priority, application Germany Nov. 6, 1959
10 Claims. (Cl. 47—10)

This invention relates to a process for boosting the flow of rosin from conifers.

Various methods for the recovery of crude rosins (sometimes called resin balsams) by tapping living conifers, such as various types of pine trees, are well known. In the extraction of the crude rosin, as is known, the pines are injured by decorticating the tree, i.e., by tearing off the bark and the external wood parts. Due to this injury, the living tree forms to an increasing extent resin which flows out of the wound. This resin flow, according to German Patent No. 638,451 is improved by treating fresh cuts with chemical stimulants such as for instance hydrochloric acid, sulfuric acid, alkalies, alcohols, phenols, and the like. While this treatment with irritants substantially accelerates the discharge of the resin ducts, an absolute increase in the yield of crude rosin occurs only to a small extent. An advantage of this process resides in the saving of working time because the extraction of resin can be carried out at intervals of 14 days while the normal extraction of resin takes place in a cut sequence of 5–7 days. The average yearly yields with both processes are about the same (see H. Kublun, "Kieferharznutzung mit chemischen Reizmitteln," publisher J. Neumann, Neudamm, 1936, page 31).

A disadvantage of the above mentioned process of treatment with irritants resides in the fact that the trunks are used up more quickly since between each two adjacent cuts in the tree there must remain a space of 1–2 cm. for otherwise the yields in resin would decrease spantaneously. Beyond this, when applying the irritants to the freshly cut wound surface, visible reactions occur. The upper cell rows of the wounded cambium and bast discolor and in certain cases the bark in the upper parts, below the incision, begins in a few days to bulge in the form of irregularly distributed swellings of about 23 mm. diameter which can often result in damage. Additionally, the pines—especially during long dry periods—may die.

Diluted solutions of β-indolyl acetic acid and α-naphthyl acetic acid or their salts are also supposed to increase the yield in resin. (Recapitulation in W. Sandermann: Naturharze, Terpentinöl, Tallöl, 1960, page 123.) However, the data on the effective increases in yield differ. According to publications of the Hercules Powder Co. on comparative tests during 25 weeks with α-naphthoxy acetate and sulfuric acid as irritants, the yields in resin with α-naphthoxy acetate are substantially higher.

According to G. H. Hepting [Science, 105, 2721 (1947)] an increase of yields in resin is also obtained when a small wound of the pines is brushed with a solution containing spores of a fusarium type found on Pinus virginiana Mill. The extraction of such spores and their further cultivation, however, cause difficulties so that this process is not used in practice.

It has now been found that certain derivatives of urea can effect a boost in the rosin flow without the above mentioned disadvantages. Such derivatives are the single- or twofold low molecular alkyl substituted ureas, or the cyclically substituted ureas. The alkyl substituent should be low molecular, advantageously containing 1–4 carbon atoms and preferably is a tertiary butyl radical. The suitable cyclically substituted ureas include the imidazolone-2 type, which may be substituted by a methyl, a furyl, or an aryl radical, the benzimidazolone-2 type which may be substituted in the benzene ring by a halogen, an alkyl, an amino-, an alkoxy- or acyl radical and the dihydroimidazolone-2. These compounds when used in very small quantities increase the rosin flow of conifers, as is shown in the following tables and examples.

The advantage of the compounds used according to this invention resides primarily in their excellent plant compatibility. Actually they are not irritant but rather substances which play a role in the physiological activity of the trees. In particular, they increase the assimilation activity and thus lead to increased formation of isoprenoid substances.

The following list of representative substituted ureas have been found to be valuable in boosting the yield of rosin from conifers, but they are to be considered purely as illustrative of suitable activators rather than being considered exhaustive. Operable compounds include N-ter.-butyl urea; N,N'-di-ter.-butyl urea; N,N'-dimethyl urea; imidazolone-2; dihydroimidazolone-2; methyl imidazolone-2; 4,5-di-[furyl-(2)]-imidazolone-2; benzimidazolone-2; 4.5-di-[phenyl-(2)]-imidazolone-2; chlorobenzimidazolone-2; 5-methoxy-benzimidazolone-2; 5-acetyl-benzimidazolone-2; 5-myristyl-benzimidazolone-2; 5-butyryl-benzimidazolone-2; 5,6-di-methyl-benzimidazolone-2; 4,5,6-trimethyl-benzimidazolone-2.

Thus the urea derivatives of this invention may be considered to have the following formula.

$$\begin{array}{c} R_2 \quad R_1 \\ | \quad | \\ HN \quad NH \\ \diagdown C \diagup \\ \| \\ O \end{array}$$

In accordance with one aspect of the invention, at least one or both of the R's is an alkyl radical of 1–4 carbon atoms while one R may be H. In accordance with another aspect of the invention, $R_1$ and $R_2$ together form a cyclic compound wherein the R's together have the following significance.

(a)  $\quad H_2C-CH_2$
  $\quad | \quad |$ (b)  $\quad XC-CY$
  $\quad | \quad |$ (X and/or Y=hydrogen, methyl, furyl or phenyl)

(c) 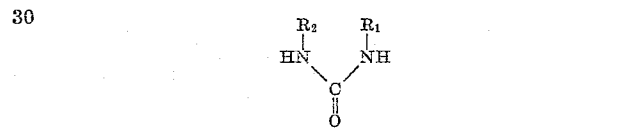

(Z=one or more halogen, alkyl, —OCH$_3$ or acetyl substituents)

The foregoing compounds may be applied to the tree in the form of an oily suspension or as paste in usual manner by applying them to the incision in the pines. They are especially effective when they are introduced into the interior of the tree by means of injections. In both instances the active substances can be considered to be applied to decorticated parts of the tree.

The effectiveness of the substances can frequently be improved in such manner that they can be applied together with already known aids to growth, as, for instance, halogenated phenoxy acetic acid, its anilides or amides or alkyl naphthyl acetic acids. Also they may be combined with the application of micro nutrients and primarily when combined with the application of salts of copper may additionally increase the flow of rosin.

The application of the activators of this invention is most practical during the period from the middle of April to the middle of May, that is in the period of the strongest assimilation activity of most conifers supplying rosins. It is understood that the substances can be applied repeatedly which leads to a further boost of the rosin flow. Effectiveness remains for a longer period.

A further advantage of the instant invention, not claimed here, resides in the fact that the urea derivatives hereof may be prepared in a simple and facile manner. Thus, for instance, one obtains benzimidazolone-2 in good yield by reacting orthophenylene diamine with urea in anhydrous glacial acetic acid. One can obtain from furoin, acetoin or benzoin and urea, in suitable acetic acid solutions, the corresponding imidazolone-2 derivatives substituted in the 4, 5 position.

The foregoing enumerations do not encompass by any means all of the advantages of the present invention. Similarly the following tables and the examples listed therein can only describe some of the possibilities encompassed within the scope of the invention.

The test area which was selected had a stock of 200 "white pines" (*Pinus silvestris*) with an average age of 100 to 120 years.

In order to eliminate sources of error which could be based on the differential in rosin yield of various trees, the 200 pines were divided into 20 test groups of 10 trees each. Each group received a distinguishing mark. The method of making wounds and the incisions followed the Vienna-procedure (Forstarchiv, 20, 178, 1944) in ascending sequence of incisions; depth of cuts 6 to 8 mm., degree of cuts 80 to 90°. In order to avoid damaging the trees, wound incisions were made only to the extent of one-third of the circumference of the trees.

In the beginning, the normal yield figures of each group were established through four successive test incisions without treatment with the activator substituted urea hereof. The actual rosin extraction took place in the period from May 9, 1958, through September 22, 1958. The incisions were applied in seven day rotations. Small synthetic cups served as collecting receptacles for the balsam. These cups were emptied every 24 hours after making the incisions and the yield of balsam was determined.

The following examples set out the results obtained by following the above procedures.

EXAMPLE I

*Increasing rosin flow by injection*

The increase of rosin flow was evaluated by introduction of the effective substances by means of injection. The substances listed in Table I below were injected into the interior of the tree in an oily suspension (linseed oil) or in alcoholic solution or suspension. These treatments took place on May 9, June 10 and July 10 of 1958.

The pines were drilled at the foot, near the roots, to a depth of 5–7 cm., the active substances were put in the holes and the drill holes closed with cork stoppers and sealed with tree wax. When desired, or necessary one may treat the trees at the point of the injection with sulfur or with a fungicide to avoid mushroom formations. The results are shown in Table I.

TABLE I

| Active substance | Dosage per tree in mg., in 5–10 ml. oil or alcohol | Average rosin (balsam) yield of 10 trees per cut in g. | Yield increase in percent |
| --- | --- | --- | --- |
| Control without active ingredient | | 450 | |
| Imidazolone-2 | 400 | 530 | 17.7 |
| Benzimidazolone-2 | 400 | 490 | 8.8 |
| t-Butyl-urea | | | |
| Copper sulfate | Each 400 | 550 | 20.2 |
| N,N'-di-t-butyl-urea | | | |
| Imidazolone-2 | | | |
| Benzimidazolone-2 | Each 100 | 510 | 13.3 |
| Benzimidazolone-2 | | | |
| α-Naphthyl acetic acid methyl ester | Each 400 | 520 | 15.5 |

EXAMPLE II

*Increasing rosin flow by brushing active substance on wounds*

The active ingredients set out in Table II below were brushed on the cut surface of the pines in the form of an oily suspension. These treatments took place three times, namely on May 9, June 10 and July 10, 1958. The results are set out in Table II.

TABLE II

| Active substance | Dosage in mg. per tree | Average rosin (balsam) yield of 10 trees per cut in g. | Yield increase in percent |
| --- | --- | --- | --- |
| Control without active ingredient | | 450 | |
| t-Butyl-urea | 400 (in 7 ccm. linseed oil) | 570 | 26.6 |
| N,N'-di-t-butyl-urea | 400 | | |
| Copper sulfate | | | |
| Manganese sulfate | | | |
| Iron sulfate | Each 100 | 526 | 16.8 |
| Boric acid | | | |
| Magnesium sulfate | | | |
| Imidazolone-2 | | | |
| Benzimidazolone-2 | do | 530 | 17.7 |
| t-Butyl-urea | | | |
| N,N'-di-t-butyl-urea | | | |
| t-Butyl-urea | | | |
| α-Naphthyl acetic acid methyl ester | Each 400 | 600 | 33.3 |
| Benzimidazolone-2 | do | 530 | 17.7 |
| Copper sulfate | | | |
| Imidazolone-2 | | | |
| 2,4-dichlorphenoxy-acetic acid | Each 200 | 500 | 10.1 |

Although the foregoing examples have reported the results obtained by treating *Pinus silvestris* it will be understood that the methods of this invention are generally applicable to conifers and that the substituted urea activators hereof will stimulate the flow of rosins from other types of conifers, especially certain classes of pines, capable of exuding rosin gums. As is known, these raw gums comprise, for the most part, so-called rosin and turpentine. For example, it has been found that the activators hereof are especially effective in stimulating the rosin flow of *Pinus palustris*, which are found primarily in the United States, and *Pinus maritima*, which are found primarily in France.

Various modifications in the details of this invention will occur to those skilled in the art to which the invention appertains without departing from the spirit of the invention or its scope as defined in the appended claims.

We claim:

1. A process for increasing the flow of rosin from conifers, which comprises applying to decorticated parts of the conifer a substituted urea selected from the group consisting of a low molecular alkyl substituted urea, dihydroimidazolone-2, an imidazolone-2, and a benzimidazolone-2.

2. The process of claim 1 in which more than one substituted urea is applied as a stimulant.

3. A process for increasing the flow of rosin from conifers, which comprises applying to incisions made in a conifer for tapping a substituted urea selected from the group consisting of a low molecular alkyl substituted urea, dihydroimidazolone-2, an imidazolone-2, and a benzimidazolone-2.

4. A process for increasing the flow of rosin from conifers, which comprises injecting into the trunk of the conifer a substituted urea selected from the group consisting of a low molecular alkyl substituted urea, dihydroimidazolone-2, an imidazolone-2, and a benzimidazolone-2.

5. A process for increasing the flow of rosin from conifers, which comprises applying to decorticated parts of *Pinus silvestris* a substituted urea selected from the group consisting of a low molecular alkyl substituted urea, dihydroimidazolone-2, an imidazolone-2, and a benzimidazolone-2.

6. A process for increasing the flow of rosin from conifers, which comprises applying to decorticated parts of *Pinus palustris* a substituted urea selected from the group consisting of a low molecular alkyl substituted urea, dihydroimidazolone-2, an imidazolone-2, and a benzimidazolone-2.

7. A process for increasing the flow of rosin from conifers, which comprises applying to decorticated parts of *Pinus maritima* a substituted urea selected from the group consisting of a low molecular alkyl substituted urea, dihydroimidazolone-2, an imidazolone-2, and a benzimidazolone-2.

8. A process for increasing the flow of rosin from conifers, which comprises applying to decorticated parts of the conifer a substituted urea substituted by 1-2 alkyl radicals containing 1-4 carbon atoms.

9. A process for increasing the flow of rosin from conifers, which comprises applying to decorticated parts of the conifer an imidazolone-2 selected from the group consisting of imidazolone-2, a methyl imidazolone-2, a furyl imidazolone-2, and an aryl imidazolone-2.

10. A process for increasing the flow of rosin from conifers, which comprises applying to decorticated parts of the conifer a benzimidazolone-2 selected from the group consisting of benzimidazolone-2, benzimidazolone-2 substituted in the benzene ring by a halogen, benzimidazolone-2 substituted in the benzene ring by an alkyl radical, benzimidazolone-2 substituted in the benzene ring by an amino-radical, benzimidazolone-2 substituted in the benzene ring by an alkoxy radical, and benzimidazolone-2 substituted in the benzene ring by an acyl radical.

References Cited in the file of this patent

UNITED STATES PATENTS 2,053,031    Hessenland et al. -------- Sept. 1, 1936

OTHER REFERENCES

Farmers' Bulletin No. 1984 published February 1947 by U.S. Department of Agriculture, entitled "Modern Turpentining Practices," 12 pages.